United States Patent
Yamamoto et al.

(10) Patent No.: US 7,285,359 B2
(45) Date of Patent: Oct. 23, 2007

(54) SECONDARY BATTERY-USE NEGATIVE ELECTRODE AND SECONDARY BATTERY USING IT

(75) Inventors: Hironori Yamamoto, Tokyo (JP); Mitsuhiro Mori, Tokyo (JP); Jiro Iriyama, Tokyo (JP); Mariko Miyachi, Tokyo (JP); Koji Utsugi, Tokyo (JP); Yutaka Bannai, Tokyo (JP); Tamaki Miura, Tokyo (JP); Ikiko Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 435 days.

(21) Appl. No.: 10/502,268

(22) PCT Filed: Jan. 22, 2003

(86) PCT No.: PCT/JP03/00566

§ 371 (c)(1),
(2), (4) Date: Jul. 22, 2004

(87) PCT Pub. No.: WO03/063270

PCT Pub. Date: Jul. 31, 2003

(65) Prior Publication Data

US 2005/0147888 A1     Jul. 7, 2005

(30) Foreign Application Priority Data

Jan. 23, 2002   (JP)   ............... 2002-013749

(51) Int. Cl.
    *H01M 4/58*   (2006.01)

(52) U.S. Cl. .............. 429/231.95; 429/231.1; 429/231.4; 429/231.8; 429/222; 429/225; 429/226; 252/182.1

(58) Field of Classification Search ............. 429/231.1, 429/231.95, 231.4, 231.8, 222, 225, 226; 252/182.1
See application file for complete search history.

(56) References Cited

U.S. PATENT DOCUMENTS 6,030,726 A * 2/2000 Takeuchi et al. ......... 429/231.8

FOREIGN PATENT DOCUMENTS

| CN | 1170243 A | | 1/1998 |
|----|-----------|---|--------|
| JP | 2001-243952 A | | 9/2001 |
| JP | 2001-256967 A | | 9/2001 |
| JP | 2002-15729 | * | 1/2002 |
| JP | 2002-15729 A | | 1/2002 |

* cited by examiner

*Primary Examiner*—Laura Weiner
(74) *Attorney, Agent, or Firm*—Sughrue MIon Pllc.

(57) ABSTRACT

An object of the present invention is to provide a negative electrode for a secondary battery which has large capacity and restrains a rise in resistance inside the battery and reduction in capacity even after cycles and the secondary battery using the same. A first active material layer 2a comprising members occluding and releasing Li onto a collector 1a is formed and a second active material layer 3a as an alloy layer containing metal forming alloy with lithium or lithium and metal not-forming alloy with lithium is formed thereon. The secondary battery is constituted using the negative electrode.

9 Claims, 11 Drawing Sheets

SECONDARY BATTERY-USE NEGATIVE ELECTRODE AND SECONDARY BATTERY USING IT

TECHNICAL FIELD OF THE INVENTION

The present invention relates to a negative electrode for secondary battery and a secondary battery using the same.

BACKGROUND ART

Due to wide use of mobile terminals such as cellular phones, laptop personal computers and the like, the importance of batteries as a power source has gained recognition. These batteries are required to be compact, lightweight, and large-capacity, and further required capability hard to deteriorate despite repeated charge and discharge.

From a viewpoint of high-energy density and lightweight, lithium metal is sometimes used for a negative electrode, but in this case, phenomena of deposition of capillary crystal (dendrite) on lithium surface or of peeling of this dendrite from a collector occur in association with progress of the charge and discharge cycles. As a result, the dendrite penetrates a separator to cause short circuit inside, whereby there have been problems that life of a battery shortens and that cycle property deteriorates.

Thus, carbon material free from the above-mentioned problems is used for practical batteries. A representative example is the carbon material of graphite base, however, the amount of lithium ion that the material can occlude is restricted by an amount insertable between layers of graphite, therefore it is difficult to excess 372 mAh/g of the specific capacity. A method using an oxide capable of occluding lithium ion more than graphite and being large in the specific capacity has been developed.

For instance, Japanese Laid-Open Patent Publication No. 2000-12036 proposes a method that metal fine particles are added and dispersed in melted oxide particles to enhance the electron conductivity, thereby effectively using lithium ion occluding site.

Japanese Laid-Open Patent Publication No. H10-334889 also discloses a negative electrode in which carbon particles supporting two or more kinds of metals including metals such as Ag and Sn that forms alloy with lithium and metals such as Cu that do not form alloy with lithium are made into a mass of the above-mentioned particles with use of a bonding agent and the mass is used as a negative electrode active material.

In the above-mentioned prior art, however, it is difficult to obtain sufficient capacity.

For instance, in an art described in Japanese Laid-Open Patent Publication No. H10-334889, a negative electrode with a configuration in which a plurality of metals are supported on carbon particles has been problems that the initial discharge capacity is lower than a capacity expected from used material and further a capacity is remarkably reduced after the charge and discharge cycles. These problems will be described below.

The above-mentioned reduction in the initial discharge capacity is considered to result from peeling of the bound portion among particles and damage on an electrode active material layer in an initial charge and discharge process. Material such as Sn that is large in an amount of lithium occlusion has a large charge and discharge capacity, but variation in volume in association with charge and discharge is large. Therefore, when carbon particles supporting such a material is bound to configure a negative electrode, it is considered that in the initial charge and discharge process, a part of the bound portion among particles is damaged, whereby a rise in internal resistance and a reduction in capacity occur.

On the other hand, the reduction in capacity after the charge and discharge cycles is inferred to be caused by not only damage on the bound portion among the particles in association with the above-mentioned variation in volume, but also microscopic inhomogeneity in an electric field occurred in the negative electrode. When metal particles and the like is mixed in the carbon particles, nonuniformity in distribution usually arises due to difference and so on in properties of the powder. Carbon particles and metal particles have different resistivity and specific capacity respectively, therefore the microscopic inhomogeneity in distribution of the electric field occurs. Thus, since the variation in volume in the charge and discharge process is localized, the configuration of the negative electrode is broken down, consequently the reduction in capacity occurs.

DISCLOSURE OF THE INVENTION

Then, in consideration of the above-mentioned problems of the above-mentioned prior arts, an object of the present invention is to provide a negative electrode for secondary battery which is large-capacity and in which a rise in resistance inside the battery and a reduction in capacity are curbed even after the charge and discharge cycles and a secondary battery using the same.

The present invention for solving the above-mentioned problems provides a negative electrode for a secondary battery capable of occluding and releasing lithium ion, wherein the negative electrode for secondary battery containing metals forming alloy with lithium or lithium and metals not-forming alloy with lithium, and including at least one layer comprising the alloy or complex oxide.

The present invention also provides a negative electrode for a secondary battery capable of occluding and releasing lithium ion, wherein the negative electrode for secondary battery contains metals forming alloy with lithium and metals not-forming alloy with lithium, and includes at least one layer comprising the alloy or complex oxide.

The present invention also provides a negative electrode for secondary battery, wherein the metals forming alloy with lithium contains at least one kind of metal selected from a group comprising Si, Ge, Sn, Al, Pb, Pd, Ag, In, and Cd in the above-mentioned negative electrode for secondary battery.

The present invention further provides a negative electrode for secondary battery, wherein the metals not-forming alloy with lithium contains at least one kind of metal selected from a group comprising Cu, Fe, B, Ni, Ti, Ta, W, Cr, and Co in the above-mentioned negative electrode for secondary battery.

The present invention also provides a negative electrode for secondary battery further including a layer consisting of lithium occlusion material in the above-mentioned negative electrode for secondary battery.

The present invention also provides a negative electrode for secondary battery, wherein a layer consisting of lithium occlusion material is a carbon-based layer in the above-mentioned negative electrode for secondary battery.

The present invention also provides a negative electrode for secondary battery, wherein a layer consisting of the above-mentioned alloy or complex oxide is a layer formed through a sputtering technique, a CVD technique, a vapor deposition technique, or a plating technique in the above-mentioned negative electrode for secondary battery.

The present invention also provides a negative electrode for secondary battery further including a lithium metal layer in the above-mentioned negative electrode for secondary battery.

The present invention further provides a secondary battery having the above-mentioned negative electrode for secondary battery, a positive electrode capable of occluding and releasing lithium ion, and electrolyte arranged between the above-mentioned negative electrode and the above-mentioned positive electrode.

The negative electrode according to the present invention includes a layer consisting of alloy or complex oxide which comprises alloy containing metals forming alloy with lithium or lithium and metals not-forming alloy with lithium. This layer is different from a collector of particles bound with bonding agent through the aforementioned prior art, and is a film formed in a film shape with the alloy including metals forming alloy with lithium or lithium and metals not-forming alloy with lithium. Further in the present invention, metals forming alloy with lithium means metals forming plateau at 0~2.5V of an electrode potential against lithium when occluding and releasing lithium in an electrode against lithium. While, metals not-forming alloy with lithium means metals not-forming plateau at 0~2.5V of the electrode potential against lithium when occluding and releasing lithium.

The present invention forms a layer comprising alloy or complex oxide in a film shape, thereby to have following action effect.

Firstly, binding between materials constituting the layers comprising the alloy or the complex oxide can be strengthen, so that destruction of layer structure due to variation in volume in association with the charge and discharge is hard to arise. As a result, a rise in internal resistance in an initial charge is restrained to curb reduction in an initial capacity of discharge. After further cycles, action of inhibiting destruction of the alloy layer is maintained, whereby the rise in resistance inside the battery and the reduction in capacity can be prevented from occurring.

Secondly, since metal forming alloy with lithium or lithium is relatively uniformly distributed in a layer comprising alloy or complex oxide, stress due to the variation in volume in association with the charge and discharge can be prevented from arising locally. Consequently, destruction of a structure of a negative electrode active material layer is curbed, and the rise in resistance inside the battery and the reduction in capacity can be prevented from occurring even after the cycles.

Also, the layer comprising the alloy or the complex oxide containing the metal forming alloy with lithium or lithium and the metal not-forming alloy with lithium is employed, thereby to have following action effect.

Firstly, since the metal not-forming alloy with lithium does not cause the variation in volume in the case of the charge and discharge, the variation in volume as a whole can be restrained.

Secondly, since the metal not-forming alloy with lithium plays a role as a wedge supporting the structure of the negative active material layer, the destruction of the structure is curbed even when shrinkage in volume arises.

In the present invention, a multiplier effect of them enables effective prevention of the destruction of the structure of the layer comprising the alloy or the complex oxide.

As a result, the rise in resistance inside the battery and the reduction in capacity can be prevented from occurring even after the cycles.

Further, in the case of the constitution provided with a layer consisting of lithium occlusion material, for instance, a carbon-based layer, charge and discharge potential of each layer configuring the negative electrode is different, so that charge and discharge is performed in stages, whereby expansion and shrinkage of the negative active material layer is enabled to be further restrained.

EMBODIMENT OF THE INVENTION

Preferred embodiments of the present invention will be described below.

First Embodiment

First embodiment of the present invention is described in detail in reference to drawings.

Figure 1:
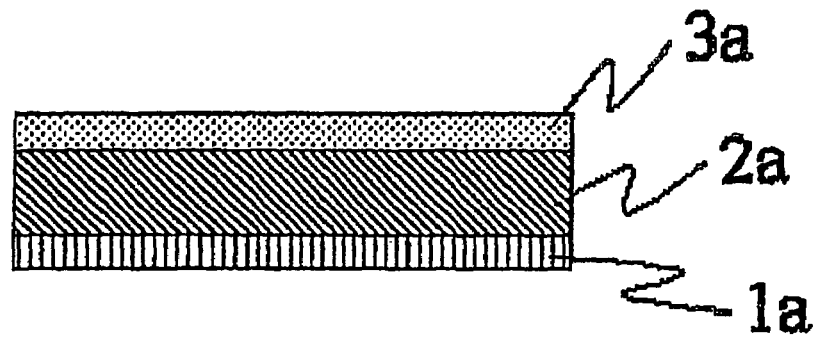
FIG. 1 is a cross-sectional view of a negative electrode for secondary battery showing a first embodiment.

FIG. 1 is a cross-sectional view of a negative electrode of a secondary battery showing the first embodiment of the present invention.

A collector 1a is an electrode for taking out current to outside of a battery in the case of charge and discharge and taking in the current into the battery from the outside. Various kinds of conductive metal foils may be adopted for a collector 1a, for instance, aluminum, copper, stainless steel, gold, tungsten, molybdenum and titanium are listed.

A first active material layer 2a is a negative electrode member occluding and releasing Li in the case of the charge and discharge. Lithium alloy, lithium occlusion metal, lithium occlusion alloy, metal oxide, graphite, hard carbon, soft carbon, fullerene, carbon nanotube, mixture of these plural materials, or matter constituted from these materials are listed as the first active material layer 2a. It is desirable that thickness of the first active material layer 2a is approximately 5 to 200 μm.

A second active material layer 3a is a film capable of occluding and releasing Li, and is constituted of alloy material or complex oxide containing metal forming alloy with lithium or lithium and metal not-forming alloy with lithium. In addtion, the second active material layer 3a may be a structure containing oxygen and the like and may also contain lithium in the alloy. As the metal not-forming alloy with lithium, Cu, Fe, B, Ni, Ti, Ta, W, Cr, and Co and so on are listed. As the metal forming alloy with lithium, Si, Ge, Sn, Al, Pb, Pd, Ag, In, Cd and so on are listed. As examples of the alloy material and complex oxide, Si—Cu alloy, Si—Fe alloy, Sn—Co alloy, Li—Ti—O oxide, and Na—Si—B—O oxide are listed. Ratio of metal forming alloy with lithium or lithium to metal not-forming alloy with lithium may be, for instance, 100:1 to 1:10 (ratio of the number of atom). The reason is that when the metal not-forming alloy with lithium is too little, effect as a wedge decreases, thus destruction of structure proceeds due to the charge and discharge. Also, the reason is that when the metal not-forming alloy with lithium is too much, the ratio that lithium can be occluded in the negative electrode decreases, therefore priority cannot be maintained in a specific capacity.

The second active material layer 3a can be prepared, for instance, in following manners. The second active material layer 3a may be obtained through a method of synthesizing by melting the metal forming alloy with lithium or lithium and the metal not-forming alloy with lithium, a method of preparing by chemical reaction, a method of preparing by mechanical milling and the like, or a method of preparing by forming sintered material into a film in vacuum as a sputtering target, a vapor deposition material and the like. The second active material layer 3a may also be obtained through a method of forming into a film gas containing the metal forming alloy with lithium or lithium and the metal not-forming alloy with lithium through CVD technique, a method of forming a film from a solution containing the metal forming alloy with lithium or lithium and the metal not-forming alloy with lithium through plating technique, or an ion plating method of ionizing the metal forming alloy with lithium or lithium and the metal not-forming alloy with lithium in an atomic or molecular state by vaporization, and accumulating on a substrate of negatively high potential at an accelerated rate. When preparing the second active material layer 3a by the above-mentioned methods, the amount of metal not-forming alloy with lithium may be, for instance, 5~35 atom %.

It is preferable that the second active material layer 3a is an amorphous structure. Consequently, a rise in resistance inside the battery and reduction in capacity may be further restrained even after cycles. Amorphous in the present invention has a broad scattered band with a peak of 2 θ value in a range of 15 to 40 degree in X-ray diffraction technique using CuK alpha ray. The second active material layer 3a is desirable to be in a range of 0.1 μm~30 μm.

A negative electrode for the secondary battery shown in FIG. 1 is produced in following procedure. At first, the first active material layer 2a is accumulated on a collector 1a. The second active material layer 3a comprising metal forming alloy with lithium or lithium and metal not-forming alloy with lithium is formed on the first active material layer 2a through the above-mentioned method to obtain a desired negative electrode.

Figure 2:
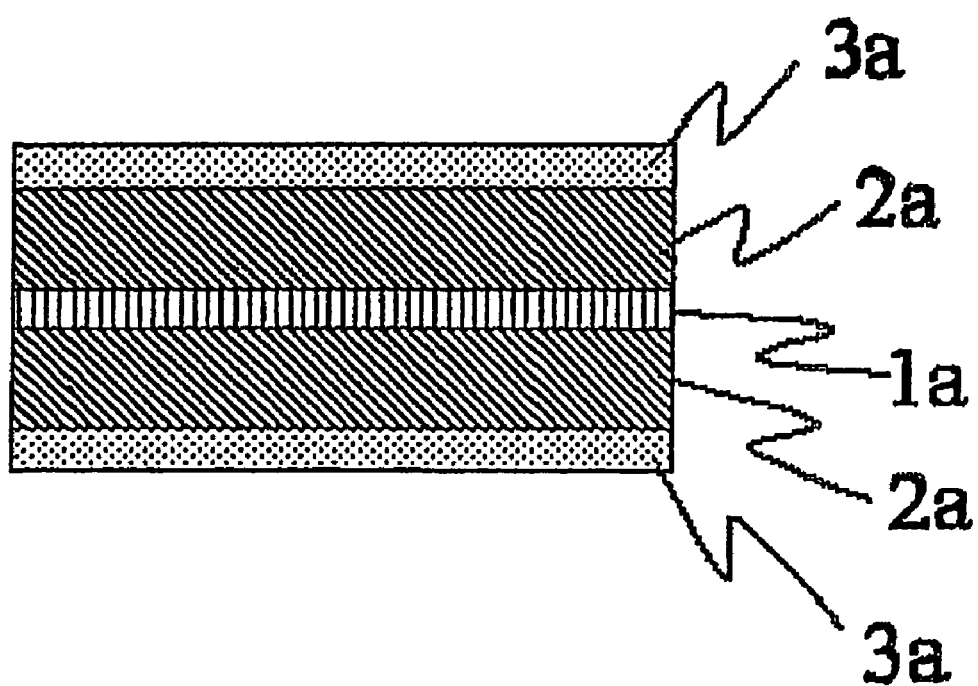
FIG. 2 is a cross-sectional view of a negative electrode for secondary battery showing the first embodiment.

Further, as shown in FIG. 2, a structure such that the first active material layer 2a and the second active material layer 3a are accumulated on both surfaces of the collector 1a may be employed.

As a positive electrode which may be used for the lithium secondary battery in the present invention, a product in which complex oxide in a form of $Li_xMO_2$ (where M is at least one transition metal) for instance, $Li_xCoO_2$, $Li_xMn_2O_4$, $Li_xMnO_3$, $Li_xNi_yCl_yO_2$, and the like and material dispersed and kneaded a bonding agent such as conductive material such as carbon black and the like and polyvinylidene fluoride (PVDF) and the like with solvent such as N-methyl-2-pyrrolidone (NMP) and the like are applied on a substrate of aluminum foil etc. may be used.

The use of these compounds enables a stable achievement of high electromotive force. In the case of the structure such that M includes at least Ni, cycle property and the like are improved. Preferably, x has such range that valence of Mn is +3.9 or more. In the case of 0<y in the above-mentioned compounds, also Mn is substituted to lighter element and the amount of discharge per weight increases to achieve a large capacity.

A battery may also be manufactured by laminating the negative electrode of lithium secondary battery in the present invention with the aforementioned positive electrode via a separator comprising a porous film of polyolefin such as polypropylene and polyethylene and fluorocarbon resin and the like in a dry air or in inert gas atmosphere, or rolling the laminated object, subsequently packing in a battery can or sealing with flexible film etc. comprising a laminated product of synthetic resin and metal foil.

Further, as an electrolytic solution, one or more aprotic organic solvents such as cyclic carbonates such as propylene carbonate (PC), ethylene carbonate (EC), butylene carbonate (BC), and vinylene carbonate (VC), chain type carbonates such as dimethyl carbonate (DMC), diethyl carbonate (DEC), ethylmethyl carbonate (EMC), and dipropyl carbonate (DPC), aliphatic carboxylic acid esters such as methyl formate, methyl acetate, and ethyl propionate, γ-lactones such as γ-butyrolactone, chain type ethers such as 1,2-ethoxy ethane (DEE) and ethoxymethoxy ethane (EME), cyclic ethers such as tetrahydrofuran and 2-methyl tetrahydrofuran, dimethyl sulfoxide, 1,3-dioxolan, formamide, acetoamide, dimethyl formamide, dioxolan, acetonitrile, propylnitorile, nitromethane, ethyl monoglyme, phosphate ester, trimethoxy methane, dioxolan derivative, sulfolane, methyl sulfolane, 1,3-dimethyl-2-imidazolidinone, 3-methyl-2-oxazolidinone, propylene carbonate derivative, tetrahydrofuran derivative, ethyl ether, 1,3-propane sultone, anisole, and N-methyl pyrrolidone are mixed and used, and lithium salt soluble in these organic solvent is dissolved. As lithium salt, $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, lower aliphatic carboxylic acid lithium carboxylate, chloroborane lithium, tetraphenyl lithium borate, LiBr, LiI, LiSCN, LiCl, and imides are listed. Polymer electrolyte is used instead of electrolytic solution.

Figure 3:
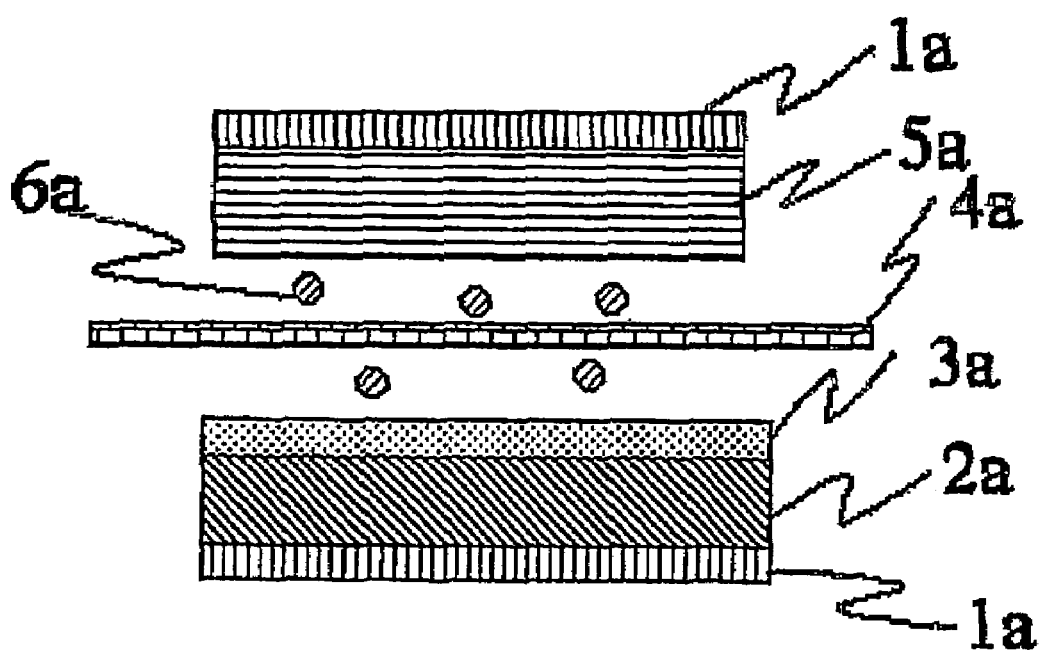
FIG. 3 is a schematic view of a battery using a negative electrode for secondary battery showing the first embodiment.
Figure 4:
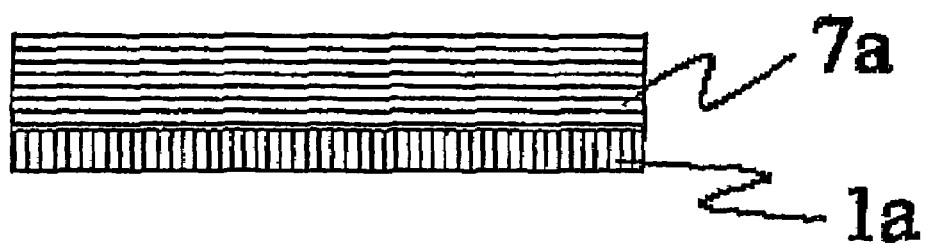
FIG. 4 is a cross-sectional view of a negative electrode for secondary battery according to comparative example 1.

Then, performance in the case that the negative electrode of the secondary battery shown in FIG. 1 or 2 is built in a battery is described in detail using FIG. 3. FIG. 3 is a schematic view of the battery using a negative electrode of first embodiment in the present invention. In this embodiment, the second active material layer 3a corresponds to "a layer comprising alloy or complex oxide containing metal forming alloy with lithium or lithium and metal not-forming alloy with lithium" and the first active material layer 2a corresponds to "a layer comprising lithium occlusion material". When charging, the negative electrode receives lithium ion 6a through electrolytic solution from a positive electrode active material layer 5a opposing with sandwiching a separator 4a which separates the negative electrode and a positive electrode. For instance, when carbon-based material is used for the first active material layer 2a, lithium ion 6a is firstly occluded into the second active material layer 3a because the second active material layer 3a is higher in discharge potential than the first active material layer 2a. When occlusion of lithium into the second active material layer 3a is terminated, lithium ion 6a goes through the second active material layer 3a, and then is occluded into the first active material layer 2a. When lithium is filled up in the first active material layer 2a, charge is completed. When discharging, lithium ion 6a occluded into the first active material layer 2a which is low in discharge potential is firstly released. Then, lithium ion 6a occluded into the second active material layer 3a is released. The released lithium ion 6a transfers to the positive electrode active material layer 5a through the electrolytic solution.

Since the second active material layer 3a is in a film shape, binding between constituent metals is strong, and distribution of the constituent metals is uniform. Therefore, destruction in structure of the second active material layer 3a involved in variation in volume caused in charge and discharge is restrained. Since the second active material layer 3a further contains metal not-forming alloy with lithium, variation in volume involved in the charge and discharge can be curbed. The metal not-forming alloy with lithium plays a role as wedge holding the structure of the second active material layer 3a. A multiplier effect of the above-mentioned influence enables effective prevention of destruction of structure such as pulverization even after the charge and discharge. As the result, a rise in internal resistance at an initial charge is restrained to obtain an excellent initial discharge capacity. Further, even after cycles, a function of deterring destruction of the above-mentioned alloy layer is maintained, therefore the rise in resistance inside the battery and occurrence of reduction in capacity can be prevented.

Further, employing a multilayer structure comprising the first active material layer 2a different from the second active material layer 3a in the charge and discharge potentials and the second active material layer 3a enables a stepwise charge and discharge and alleviation of expansion and shrinkage of the negative electrode active material layer due to the charge and discharge. Also, a multiplier effect of this function and another function by employing the above-mentioned configuration of the second active material layer 3a enables further restraint of the expansion and shrinkage of a whole negative electrode active material layer.

EXAMPLE 1

Example 1 of first embodiment in the present invention will be described below.

A negative electrode of a secondary battery shown in FIG. 1 was prepared in following steps. At first, copper foil of thickness of 10 μm was used for a collector 1a, artificial graphite of thickness of 100 μm was accumulated on the collector 1a as a first active material layer 2a. Then, Si—Cu alloy was formed as a second active material layer 3a through a sputtering technique to obtain a negative electrode. Lithium cobalt oxide combination agent was used for a positive electrode active material and aluminum foil was used for the collector. As a electrolytic solution, a mixed solvent of ethylene carbonate (EC) and diethyl carbonate (DEC) (ratio of mixing volume: EC/DEC=30/70) in which the concentration of $LiPF_6$ in the electrolytic solution is 1 mol/L was used. A rectangular secondary battery was constructed using the negative electrode, the positive electrode, and the electrolytic solution. Evaluation of electric properties of the rectangular secondary battery was carried out with a charge and discharge testing machine. Current density of charge and discharge was 10 $mA/cm^2$. Evaluation of cycle properties was also performed with numerical values expressed in percentage obtained by dividing capacity maintained after 500 cycles by an initial discharge capacity.

EXAMPLE 2

In example 2, a negative electrode was prepared in a similar manner to the example 1, however natural graphite of thickness of 70 μm was used for a first active material layer 2a, and a second active material layer 3a was formed using Si—Fe amorphous alloy through a 1 μm vapor deposition technique. The other such as a positive electrode, a separator, an electrolytic solution, an evaluation method, and conditions of measurement were same as the example 1.

EXAMPLE 3

In example 3, a negative electrode was prepared in a similar manner to the example 1, however hard carbon of thickness of 90 μm was used for a first active material layer 2a, and a second active material layer 3a was formed using amorphous $WSi_2$ through a 1 μm CVD technique. The other such as a positive electrode, a separator, an electrolytic solution, an evaluation method, and conditions of measurement were same as the example 1.

EXAMPLE 4

In example 4, a negative electrode was prepared in a similar manner to the example 1. Sn of thickness of 5 μm was used for a first active material layer 2a, and a second active material layer 3a was formed using Si—Cu amorphous alloy through a 2 μm CVD technique. The other such as a positive electrode, a separator, an electrolytic solution, an evaluation method, and conditions of measurement were same as the example 1.

COMPARATIVE EXAMPLE 1

A negative electrode for comparative example 1 was prepared in following steps. Active material layer 7a was formed on a collector 1a of copper foil of thickness of 10 μm by binding carbon particles supporting Si as a metal forming alloy with lithium and Cu as a metal not-forming alloy with lithium to obtain a negative electrode. The other such as a positive electrode, a separator, an electrolytic solution, an evaluation method, and conditions of measurement were same as the example 1.

As to batteries of examples 1 to 4 and comparative example 1, results of evaluations of initial discharge capacities, initial charge and discharge efficiencies, cycle properties are shown in Table 1. From the results, the initial discharge capacities in examples 1 to 4 are found 1.2 times or more comparing to the comparative example 1. The reason is considered following. Namely, in the case of comparative example 1, expansion and shrinkage occurs due to charge and discharge, so that binding between particles on a collector of a negative electrode weakens. Thereby, an internal resistance rises and charge by sufficient capacity is prevented to further disturb a complete discharge. On the other hand, it is considered that in the cases of examples 1 to 4, because of a uniform film structure in which bonding agent is not used, a rise in internal resistance is hard to occur, and inconvenience does not arise unlike in the case of comparative example 1, therefore a higher initial discharge capacity is obtained than comparative example 1.

As shown in Table 1, it is also found that comparative example 1 rapidly fades after 150 cycles and capacity deteriorates, however, examples 1 to 4 maintains 85% or more of the initial discharge capacity even after 500 cycles.

The reason why capacity deteriorates in comparative example 1 is considered that binding by bonding agent between particles on the collector of the negative electrode is weakened due to variation in volume of metal involved in charge and discharge, and further is cut off, whereby resulting in destruction of structure of a negative electrode active material layer. Further, since distribution of metal particles is not uniform, it is also considered as one reason of the destruction of the structure of the negative electrode active material layer that stress due to variation in volume of metal caused in the charge and discharge arises locally.

On the other hand, the reason why cycle property is excellent in examples 1 to 4 is considered that since the second active material layer $3a$ is a film-shaped alloy layer, binding between metals constituting the second active material layer $3a$ and distribution of the metal is uniform, therefore the cause of deterioration of capacity in comparative example 1 is eliminated. In addition, employing metal forming alloy with lithium or lithium and metal not-forming alloy with lithium as metals constituting the second active material layer $3a$, and forming a multilayer structure by laminating the first active material layer $2a$ and the second active material layer $3a$ enables effective restraint of variation in volume of the negative electrode active material layer, thereby to contribute to excellent cycle property.

Second Embodiment

Then, second embodiment in the present invention is described in reference to drawings.

Figure 5:
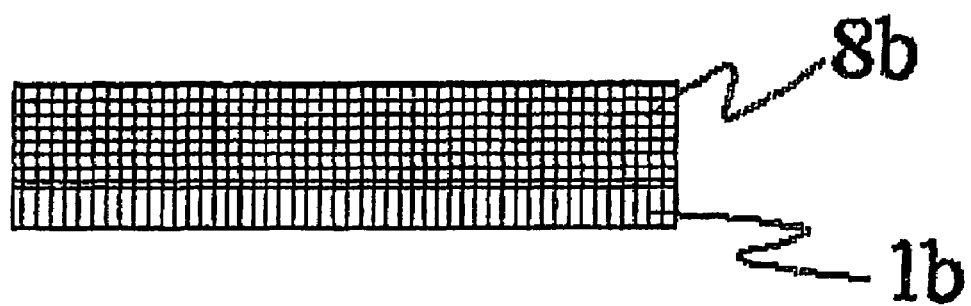
FIG. 5 is a cross-sectional view of a negative electrode for secondary battery showing a second embodiment.

FIG. 5 is a cross-sectional view of a negative electrode of a secondary battery showing the second embodiment in the present invention.

A collector $1b$ is an electrode for extracting current to outside of a battery in the case of charge and discharge and for taking in the current into the battery from outside. Various kinds of conductive metal foils can be adopted for the collector $1b$, and aluminum, copper, stainless steel, gold, tungsten, molybdenum, and titanium are listed.

In the embodiment, a negative electrode active material layer $8b$ corresponds to "a layer comprising alloy or complex oxide containing metal forming alloy with lithium or lithium and metal not-forming alloy with lithium", has a same constitution as the second active material layer $3a$ in the first embodiment, and can be prepared in a same manner. In this regard, it is desirable that the negative electrode active material layer $8b$ is 0.5 μm~30 μm.

The battery may also be manufactured using a positive electrode, a separator, and an electrolytic solution same as the first embodiment.

Figure 6:
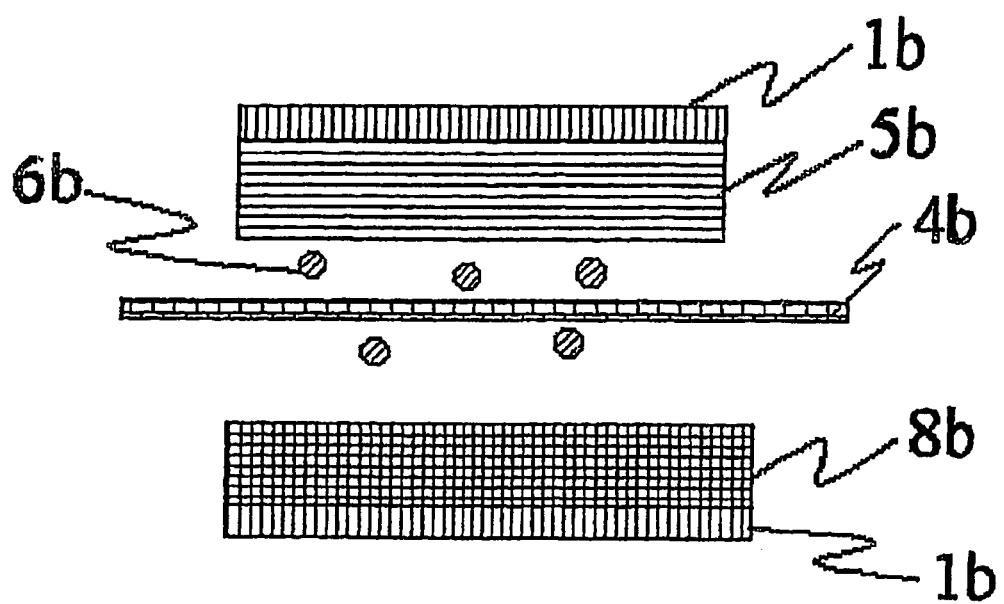
FIG. 6 is a schematic view of a battery using a negative electrode for secondary battery showing the second embodiment.

Then, performance when the negative electrode of the secondary battery is built in the battery shown in FIG. 5 is described in detail in reference to FIG. 6. FIG. 6 is a schematic view of the battery prepared using the negative electrode of the second embodiment in the present invention. When charging, the negative electrode receives lithium ion $6b$ via the electrolytic solution from a positive electrode active material layer $5b$ opposing with sandwiching a separator which separates the negative electrode and a positive electrode. The lithium ion $6b$ is occluded into the negative electrode active material layer $8b$. When lithium is filled up in the negative electrode $8b$, charge is completed. When discharging, lithium ion $6b$ occluded from the negative electrode active material layer $8b$ in charging is released. The released lithium ion $6b$ transfers to the positive electrode active material layer $5b$ through the electrolytic solution.

Since the negative electrode active material layer $8b$ is then a film shaped layer, binding between constituent metals is strong, and distribution of the constituent metals is uniform. Thus, destruction of structure of the negative electrode active material layer $8b$ involved in variation in volume occurring in charge and discharge is curbed. The negative electrode active material layer $8b$ further contains metal not-forming alloy with lithium, therefore the variation in volume involved in the charge and discharge can be restrained. The metal not-forming alloy with lithium plays a role as a wedge holding the structure of the negative electrode active material layer $8b$. A multiplier effect of the above-mentioned influence enables effective prevention of destruction of the structure such as pulverization even after the charge and discharge. As a result, a rise in internal resistance in an initial charge is restrained and an excellent initial discharge capacity is obtained. After further cycles, function of deterring destruction of the above-mentioned alloy layer is maintained and the rise in resistance inside the battery and occurrence of reduction in capacity can be restrained.

EXAMPLE 5

Example 5 of the second embodiment in the present invention is described below.

A negative electrode of a secondary battery shown in FIG. 5 was prepared in following steps. At first, copper foil of thickness of 10 μm was used for a collector $1b$, and a negative electrode active material layer $8b$ was formed on the collector $1b$ using Sn—Cu alloy through a 10 μm vapor deposition technique to obtain a negative electrode. The other such as a positive electrode, a separator, an electrolytic solution, an evaluation method, and conditions of measurement were same as the example 1.

EXAMPLE 6

In example 6, a negative electrode was prepared in a same manner as example 5, however a negative electrode active material layer $8b$ was formed using Li—Co—N system amorphous compound through a 10 μm sputtering technique. The other such as a positive electrode, a separator, an electrolytic solution, an evaluation method, and conditions of measurement were same as the example 1.

EXAMPLE 7

In example 7, a negative electrode was prepared in a same manner as example 5. A negative electrode active material layer $8b$ was formed using Li—Ti—O system amorphous compound through a 10 μm sputtering technique. The other such as a positive electrode, a separator, an electrolytic solution, an evaluation method, and conditions of measurement were same as the example 1.

Figure 7:
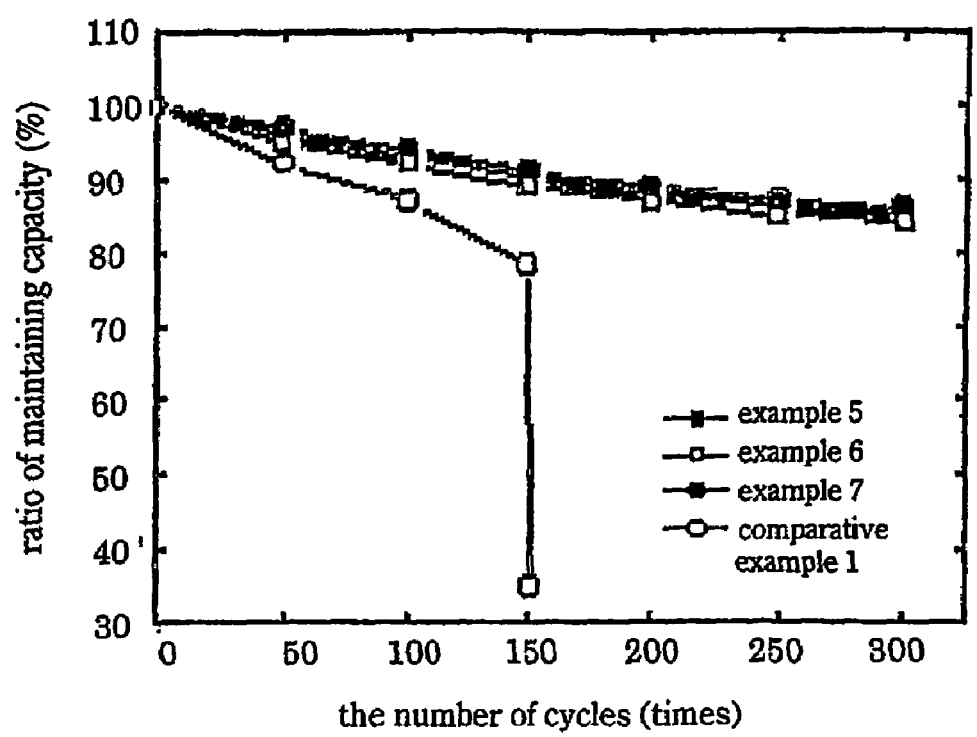
FIG. 7 is a graph showing cycle properties of examples 5 to 7 and comparative example 1.

As to batteries of examples 5 to 7 and comparative example 1, results of evaluations of cycle property are shown in FIG. 7. From the results, it is found that comparative example 1 rapidly fades after 150 cycles and capacity deteriorates, however example 5 to 7 maintains 85% or more of an initial discharge capacity even after 300 cycles. In the present embodiment, it is also indicated that employing a uniform film structure in which bonding agent is not used curbs a rise in internal resistance and restrains destruction of the structure of the negative electrode active material layer.

As to batteries of examples 5 to 7 and comparative example 1, results of the initial discharge capacity are shown in Table 2. From the results, it is found that the initial discharge capacities in examples 5 to 7 are 1.5 times or more comparing to the comparative example 1. From the viewpoint of the discharge capacity, employing only metal negative electrode active material layer with large specific capacity has an advantage to obtain a battery of large initial discharge capacity.

Third Embodiment

Then, third embodiment in the present invention is described in detail in reference to drawings.

Figure 8:
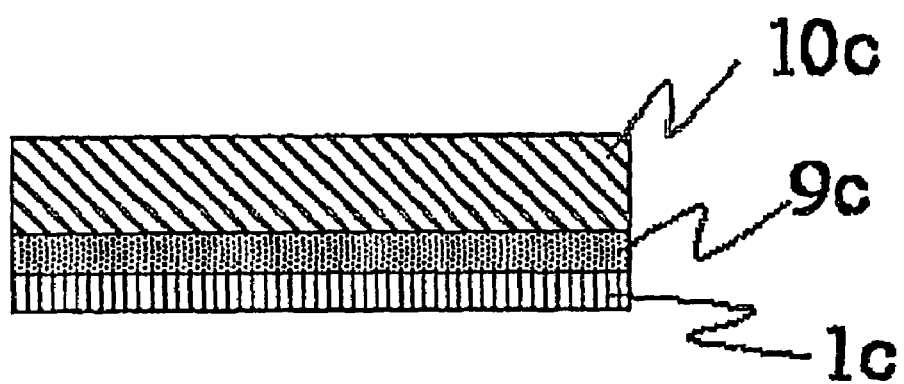
FIG. 8 is a cross-sectional view of a negative electrode for secondary battery showing a third embodiment.

FIG. 8 is a cross-sectional view of a negative electrode for a secondary battery showing the third embodiment in the present invention.

A collector $1c$ is an electrode for extracting current to outside of a battery in charge and discharge and for taking in the current into the battery from outside. Various kinds of conductive metal foils can be adopted for the collector $1c$, and aluminum, copper, stainless steel, gold, tungsten, molybdenum, and titanium are listed.

In the embodiment, a first lithium occlusion layer $9c$ corresponds to "a layer comprising alloy or complex oxide containing metal forming alloy with lithium or lithium and metal not-forming alloy with lithium", has a same constitution as a second active material layer $3a$ in the first embodiment, and can be prepared in a same manner. In this regard, it is desirable that the first lithium occlusion layer $9c$ is 0.1 μm~10 μm. A second lithium occlusion layer $10c$ corresponds to "a layer comprising lithium occlusion material" and has a same constitution as the first active material layer $2a$ in the first embodiment.

A negative electrode for a secondary battery shown in FIG. 8 is prepared in following steps. A first lithium occlusion layer $9c$ comprising metal forming alloy with lithium or lithium and metal not-forming alloy with lithium is accumulated on the collector $1c$ through a sputtering technique, a CVD technique, or a vapor deposition technique.

In addition, also in the present embodiment, the battery may be manufactured using a positive electrode, a separator, and an electrolytic solution same as the first embodiment.

Figure 9:
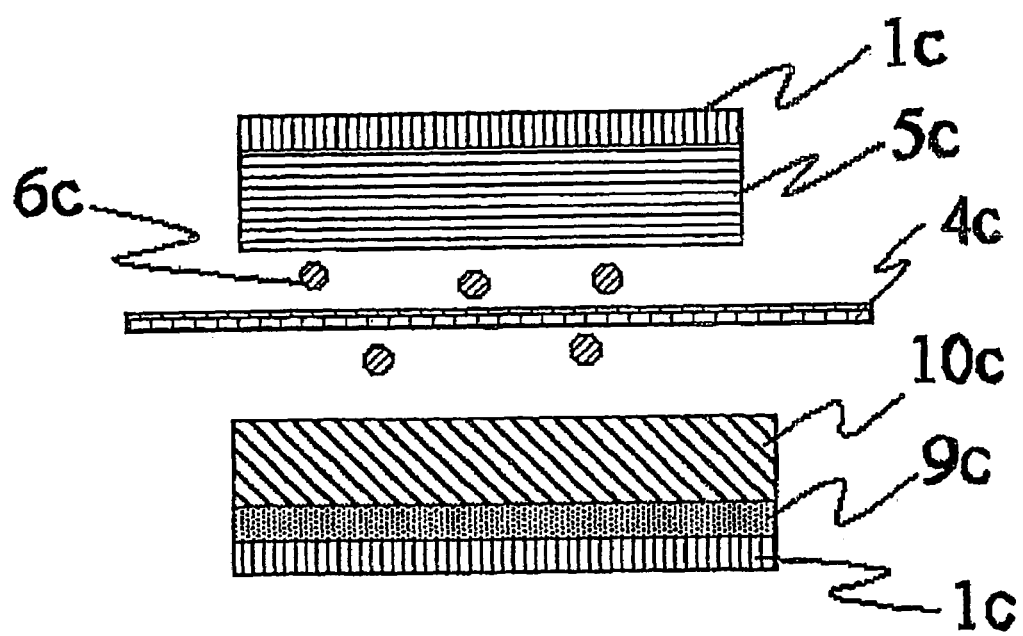
FIG. 9 is a schematic view of a battery using a negative electrode for secondary battery showing the third embodiment.

Then, performance when the negative electrode for the secondary battery shown in FIG. 8 is built in the battery is described in detail in reference to FIG. 9. FIG. 9 is a schematic view of the battery manufactured using the negative electrode of the third embodiment in the present invention. When charging, the negative electrode receives lithium ion $6c$ through the electrolytic solution from the positive electrode active material $5c$ opposing with sandwiching a separator $4c$ which separates the negative electrode and a positive electrode. For instance, in the case that carbon based material is used for the second lithium occlusion layer $10c$, since the first lithium occlusion layer $9c$ is higher in discharge potential than the second lithium occlusion layer $10c$, lithium ion $6c$ goes through the second lithium occlusion layer $10c$ and is first occluded into the first lithium occlusion layer $9c$. When lithium occlusion into the first lithium occlusion layer $9c$ is terminated, then lithium ion $6c$ is occluded into the second lithium occlusion layer $10c$, and when that is terminated, charge is completed. When discharging, lithium ion $6c$ occluded into the second lithium occlusion layer $10c$ with lower discharge potential is first released. Lithium ion $6c$ occluded into the first lithium occlusion layer $9c$ is then released. The released lithium ion $6c$ from the first lithium occlusion layer $9c$ goes through the second lithium occlusion layer $10c$ and transfers the positive electrode active material layer $5c$ through the separator $4c$ via the electrolytic solution.

Since the first lithium occlusion layer $9c$ is a film shaped layer, binding between constituent metals is strong, and distribution of the constituent metals is uniform. Therefore, destruction of the structure of the first lithium occlusion layer $9c$ involved in variation in volume arising in charge and discharge is restrained. Further, since the first lithium occlusion layer $9c$ contains metal not-forming alloy with lithium, the variation in volume involved in the charge and discharge can be curbed. The metal not-forming alloy with lithium plays a role as a wedge holding the structure of the first lithium occlusion layer $9c$. A multiplier effect of the above-mentioned influences enables effective prevention of the destruction of the structure such as pulverization even after charge and discharge.

Further, employing a multilayer structure comprising the second lithium occlusion layer $10c$ different from the first lithium occlusion layer $9c$ in charge and discharge potentials and the first lithium occlusion layer $9c$ enables a stepwise charge and discharge and alleviation of expansion and shrinkage of the negative electrode active material layer due to the charge and discharge. Also, a multiplier effect of this function and another function by employing the above-mentioned configuration of the first lithium occlusion layer $9c$ enables further alleviation of expansion and shrinkage of a whole negative electrode active material layer. As a result, a rise in internal resistance in initial charge is restrained and excellent initial discharge capacity is obtained. Further, after cycles, the function of deterring destruction of the alloy layer is also maintained, therefore the rise in resistance inside the battery and occurrence of reduction in capacity can be restrained.

EXAMPLE 8

Example 8 of the third embodiment in the present invention is described below.

A negative electrode for a secondary battery shown in FIG. 8 was prepared in following steps. At first, copper foil of thickness of 8 μm was adopted for a collector $1c$, and a first lithium occlusion layer $9c$ was formed on the collector $1c$ using Sn—Ni alloy through a 30 μm plating technique. Natural graphite was then accumulated up to 50 μm as the second lithium occlusion layer $10c$ to obtain a negative electrode. The other such as a positive electrode, a separator, an electrolytic solution, an evaluation method, and conditions of measurement were same as the example 1.

EXAMPLE 9

In example 9, copper foil of thickness of 18 μm was adopted for a collector $1c$, and a first lithium occlusion layer $9c$ was formed using Sn—Co alloy through a 15 μm vapor deposition technique. Soft carbon was then accumulated up to 50 μm on the first lithium occlusion layer $9c$ as the second lithium occlusion layer $10c$ to obtain a negative electrode. The other such as a positive electrode, a separator, an electrolytic solution, an evaluation method, and conditions of measurement were same as the example 1.

EXAMPLE 10

In example 10, copper foil of thickness of 15 μm was adopted for a collector 1c, and a first lithium occlusion layer 9c was formed using Sn—Ni amorphous alloy through a 30 μm vapor deposition technique, Natural graphite was then accumulated up to 50 μm on the first lithium occlusion layer 9c as the second lithium occlusion layer 10c to obtain a negative electrode. The other such as a positive electrode, a separator, an electrolytic solution, an evaluation method, and conditions of measurement were same as the example 1.

As to batteries of examples 8 to 10, results of initial discharge capacity and an evaluation of cycle property are shown in Table 3. From the results, it is found that comparative example 1 rapidly fades after 150 cycles and capacity deteriorates, however, examples 8 to 10 maintain 82% or more of the initial discharge capacity even after 500 cycles. The present embodiment is different from the first embodiment in a point that a layer comprising metal forming alloy with lithium or lithium and metal not-forming alloy with lithium is directly in contact with the collector. However, as seen in comparison of Table 1 with Table 3, it is considered that the present embodiment shows effects of restraining the rise in internal resistance and effectively alleviating expansion and shrinkage of the negative electrode active material layer due to the charge and discharge, samely as when the first embodiment was employed.

Fourth Embodiment

Then, fourth embodiment in the present invention is described in detail in reference to drawings.

Figure 10:
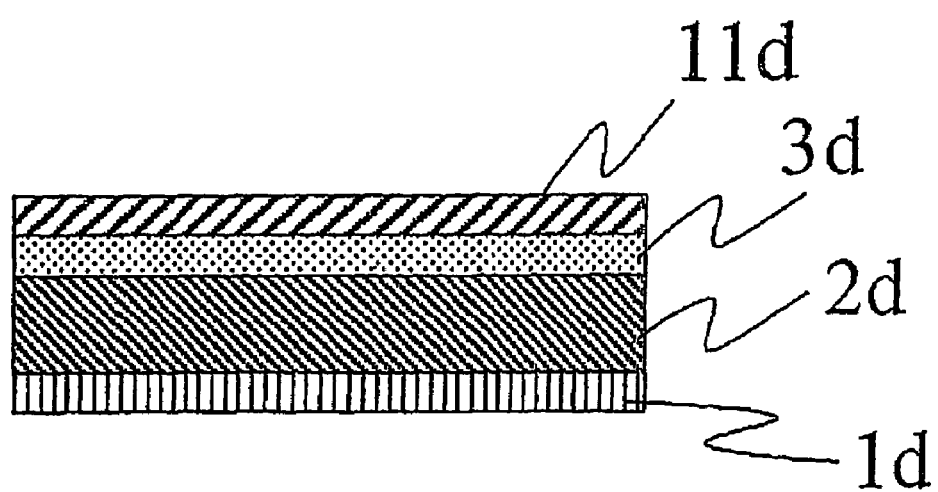
FIG. 10 is a cross-sectional view of a negative electrode for secondary battery showing a fourth embodiment.

FIG. 10 is a cross-sectional view of a negative electrode for a secondary battery showing the fourth embodiment in the present invention.

A collector 1d is an electrode for extracting current to outside of a battery in charge and discharge and for taking in the current into the battery from outside. Various kinds of conductive metal foils may be adopted for the collector 1d, and aluminum, copper, stainless steel, gold, tungsten, molybdenum, and titanium are listed.

In the embodiment, a second active material layer 3d corresponds to "a layer comprising alloy or complex oxide containing metal forming alloy with lithium or lithium and metal not-forming alloy with lithium", has a same constitution as a second active material layer 3a in the first embodiment, and can be prepared in a same manner. A first active material layer 2d corresponds to "a layer comprising lithium occlusion material", has a same constitution as the first active material layer 2a in the first embodiment, and can be prepared in a same manner.

A lithium layer 11d comprises Li metal to cover an irreversible capacity generated inside the battery. A coverage amount is desirably 80 to 120% to the irreversible capacity of the battery. If this coverage amount is too small, that does not make any sense of coverage for the irreversible capacity, and if too large, it is possible that Li metal separates out on a negative electrode surface.

A negative electrode for a secondary battery shown in FIG. 10 is prepared in following steps. A first active material layer 2d is first accumulated on the collector 1d. A second active material layer 3d comprising metal forming alloy with lithium or lithium and metal not-forming alloy with lithium is formed further on the first active material layer 2d through a sputtering technique, a CVD technique, or a vapor deposition technique. A Li layer 11d is formed further on the second active material layer 3d through the vapor deposition technique to obtain a desired negative electrode.

In addition, in the present embodiment, a battery is manufactured using a positive electrode, a separator, and an electrolytic solution same as the first embodiment.

Figure 11:
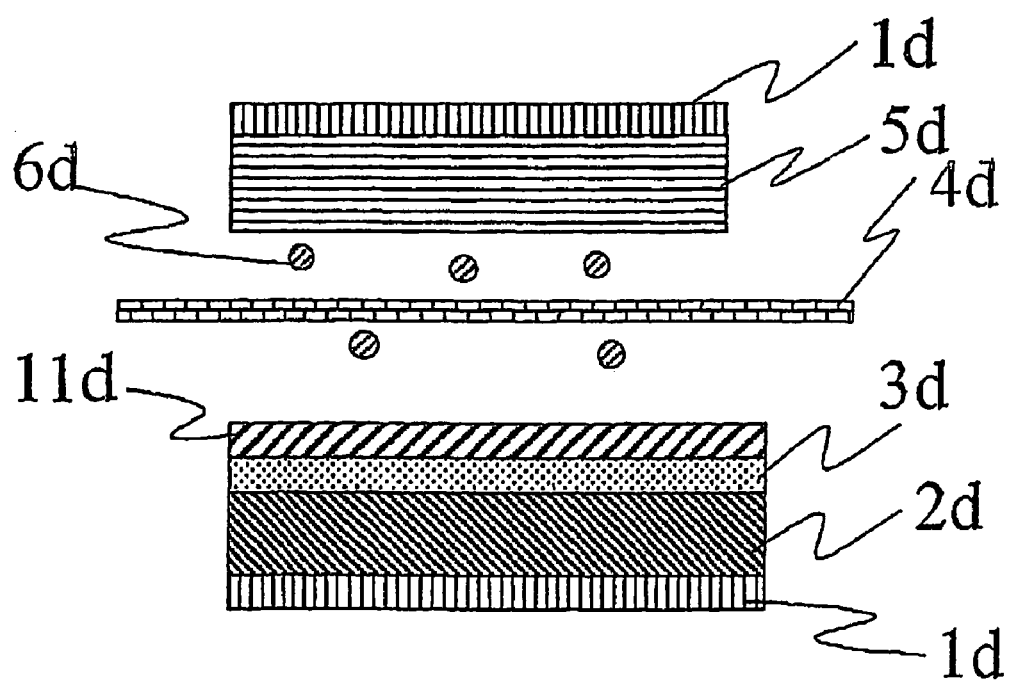
FIG. 11 is a schematic view of a battery using a negative electrode for secondary battery showing the fourth embodiment.

Then, performance when the negative electrode for the secondary battery shown in FIG. 10 is built in the battery is described in detail in reference to FIG. 11. FIG. 11 is a schematic view of the battery manufactured using the negative electrode of the fourth embodiment in the present invention. When charging, the negative electrode receives lithium ion 6d through the electrolytic solution from a positive electrode active material layer 5d opposing with sandwiching a separator 4d which separates the negative electrode and a positive electrode. For instance, in the case that carbon based material is used for the first active material layer 2d, since the first active material layer 3d is higher in discharge potential than the second lithium occlusion layer 2d, lithium ion 6d is first occluded into the second active material layer 3d. When lithium occlusion into the second active material layer 3d is terminated, then lithium ion 6d goes through the second active material layer 3d and is occluded into the first active material layer 2d. When lithium is filled up in the first active material layer 2d, charge is completed. When charging, lithium layer 11d disperses inside the negative electrode and is occluded into the first active material layer 2d or the second active material layer 3d. When discharging, lithium ion 6d occluded into the first active material layer 2d with lower discharge potential is first released. Lithium ion 6d occluded into the second active material layer 3d is then released. The released lithium ion 6d transfers the positive electrode active material layer 5d via the electrolytic solution. Li of an amount corresponding to Li layer 11d remains in an irreversible capacity site (surfaces of positive and negative electrodes, the first active material layer 2d, the second active material layer 3d, boundary face of layers, wall surface of the battery, etc.) as a form of residue or eliminated from the second active material layer 3d.

Since the second active material layer 3d is a film shaped layer, binding between constituent metals is strong, and distribution of the constituent metals is uniform. Therefore, destruction of the structure of the second active material layer 3d involved in variation in volume arising in charge and discharge is restrained. Further, since the second active material layer 3d contains metal not-forming alloy with lithium, the variation in volume involved in the charge and discharge can be curbed. The metal not-forming alloy with lithium plays a role as a wedge holding the structure of the second active material layer 3d. A multiplier effect of the above-mentioned influences enables effective prevention of the destruction of the structure such as pulverization even after the charge and discharge. As a result, a rise in internal resistance in initial charge is restrained and excellent initial discharge capacity is obtained. Also after further cycles, the function of deterring destruction of the alloy layer is also maintained, therefore the rise in resistance inside the battery and occurrence of reduction in capacity can be restrained.

Further, employing a multilayer structure comprising the first active material layer 2d different from the second active material layer 3d in the charge and discharge potentials and the second active material layer 3d enables a stepwise charge and discharge and alleviation of expansion and shrinkage of the negative electrode active material layer due to the charge and discharge. Also, a multiplier effect of this function and another function by employing the above-mentioned configuration of the second active material layer 3d enables further restraint of the expansion and shrinkage of a whole negative electrode active material layer.

EXAMPLE 11

Then, example 11 of the fourth embodiment in the present invention is described below.

A negative electrode for a secondary battery shown in FIG. 10 was prepared in following steps. At first, copper foil of thickness of 10 μm was adopted for a collector 1d, and natural graphite was accumulated up to 100 μm on the collector 1d as a first active material layer 2d. A second active material layer 3d was then formed using Si—Cu alloy through a 2 μm sputtering technique. A Li layer 11d was then formed into a film up to 1 μm (corresponding to 80% of a coverage amount of an irreversible capacity) to obtain a negative electrode. The other such as a positive electrode, a separator, an electrolytic solution, an evaluation method, and conditions of measurement were same as the example 1.

EXAMPLE 12

Also in example 12, a negative electrode was prepared in a same manner as example 11, however natural graphite of thickness of 70 μm was accumulated to form a first active material layer 2d and a second active material layer 3d was formed using Si—Fe alloy through a 1 μm vapor deposition technique. A Li layer 11d was also formed into a film up to 1.5 μm (corresponding to 100% of a coverage amount of an irreversible capacity) through a vapor deposition technique. The other such as a positive electrode, a separator, an electrolytic solution, an evaluation method, and conditions of measurement were same as the example 1.

EXAMPLE 13

Also in example 13, a negative electrode was prepared in a same manner as example 11, however hard carbon of thickness of 90 μm was accumulated to form a first active material layer 2d and a second active material layer 3d was formed using amorphous WSi2 through a CVD technique. A Li layer 11d was also formed into a film up to 2 μm (corresponding to 100% of a coverage amount of an irreversible capacity) through a vapor deposition technique. The other such as a positive electrode, a separator, an electrolytic solution, an evaluation method, and conditions of measurement were same as the example 1.

EXAMPLE 14

Also in example 14, a negative electrode was prepared in a same manner as example 11, however Sn of thickness of 5 μm was accumulated to form a first active material layer 2d and a second active material layer 3d was formed using Si—Cu alloy through a 2 μm CVD technique. Li layer 11d was also formed into a film up to 2 μm (corresponding to 120% of a coverage amount of an irreversible capacity) through a vapor deposition technique. The other such as a positive electrode, a separator, an electrolytic solution, an evaluation method conditions of measurement were same as the example 1.

As to batteries of examples 11 to, 14, results of initial discharge capacity and an evaluation of cycle property are shown in Table 4. From the results, it is found that in examples 11 to 14, the irreversible capacity is covered from the Li layer 11d and therefore available capacity increases to obtain a high efficiency of charge and discharge.

The comparative example 1 also rapidly fades after 150 cycles and capacity deteriorates, however, it is found that examples 11 to 14 maintains 85% or more of the initial discharge capacity even after 500 cycles. Also in the examples 11 to 14 same as the first and third embodiments, it is considered that a rise in internal resistance is restrained and expansion and shrinkage of the negative electrode active material layer due to the charge and discharge is effectively alleviated.

TABLE 1

|  | example 1 | example 2 | example 3 | example 4 | comparative example 1 |
|---|---|---|---|---|---|
| first active material layer 2a | artificial graphite | natural graphite | hard carbon | Sn | (binding carbon particles supporting Si and Cu) |
| second active material layer 3a | Si—Cu alloy | Si—Fe alloy | WSi2 | Si—Cu alloy |  |
| initial discharge capacity (mAh/g) | 560 | 580 | 510 | 625 | 395 |
| efficiency of initial charge and discharge | 94.5% | 95.2% | 93.8% | 94.2% | 82.4% |
| ratio of maintaining capacity after 500 cycles | 85.7% | 86.0% | 85.2% | 85.3% | breakdown after 150 cycles |

TABLE 2

|  | example 5 | example 6 | example 7 | comparative example 1 |
|---|---|---|---|---|
| negative electrode active material layer 8b | Sn—Cu alloy | Li—Co—N system compound | Li—Ti—O system compound | (binding carbon particles supporting Si and Cu) |
| initial discharge capacity (mAh/g) | 780 | 645 | 608 | 395 |

TABLE 3

|  | example 8 | example 9 | example 10 | comparative example 1 |
|---|---|---|---|---|
| first lithium occlusion layer 9c | Sn—Ni alloy | Sn—Co alloy | Sn—Ni alloy | (binding carbon particles supporting Si and Cu) |
| second lithium occlusion layer 10c | natural graphite | soft carbon | natural graphite |  |
| initial discharge capacity (mAh/g) | 545 | 572 | 518 | 395 |
| ratio of maintaining capacity after 500 cycles | 82.4% | 82.5% | 82.2% | breakdown after 150 cycles |

TABLE 4

| | example 11 | example 12 | example 13 | example 14 | comparative example 1 |
|---|---|---|---|---|---|
| first active material layer 2d | artificial graphite | natural graphite | hard carbon | Sn | (binding carbon particles supporting Si and Cu) |
| second active material layer 3d | Si—Cu alloy | Si—Fe alloy | WSi2 | Si—Cu alloy | |
| initial discharge capacity (mAh/g) | 570 | 553 | 513 | 705 | 395 |
| efficiency of initial charge and discharge | 99.7% | 99.5% | 99.4% | 99.8% | 82.4% |
| ratio of maintaining capacity after 500 cycles | 85.4% | 85.5% | 85.2% | 85.2% | breakdown after 150 cycles |

INDUSTRIAL APPLICABILITY

As described above, according to the present invention, a negative electrode is provided with an alloy layer comprising metal forming alloy with lithium or lithium and metal not-forming alloy with lithium, thereby to restrain destruction of structure of the negative electrode. As a result, the negative electrode for a secondary battery prevented a rise in resistance inside the battery and reduction in capacity and the secondary battery using the same can be provided.

The invention claimed is:

1. A negative electrode for a secondary battery capable of occluding and releasing lithium ion, comprising a lithium metal layer and at least one layer consisting essentially of an alloy or complex oxide of (1) a metal forming alloy with lithium or lithium and (2) a metal not-forming alloy with lithium.

2. A negative electrode for a secondary battery capable of occluding and releasing lithium ion, comprising a lithium metal layer and a layer consisting essentially of an alloy or complex oxide of (1) a metal forming alloy with lithium and (2) a metal not-forming alloy with lithium.

3. A negative electrode for a secondary battery as claimed in claim 1 or 2, wherein the metal forming alloy with lithium contains at least one metal selected from a group consisting of Si, Ge, Sn, Al, Pb, Pd, Ag, In and Cd.

4. A negative electrode for a secondary battery as claimed in claim 1 or 2, wherein the metal not-fonning alloy with lithium contains at least one metal selected from a group consisting of Cu, Fe, B, Ni, Ti, Ta, W, Cr and Co.

5. A negative electrode for a secondary battery as claimed in claim 1 or 2, further comprising a layer comprising a lithium occlusion material.

6. A negative electrode for a secondary battery as claimed in claim 5, wherein the layer comprising the lithium occlusion material is a carbon-based layer.

7. A negative electrode for a secondary battery as claimed in claim 1 or 2, wherein the layer comprising the alloy or complex oxide is formed through a sputtering technique, a CVD technique, a vapor deposition technique, or a plating technique.

8. A negative electrode for a secondary battery as claimed in claim 1 or 2, wherein the layer comprising the alloy or complex oxide has an amorphous structure.

9. A secondary battery provided with the negative electrode for a secondary battery as claimed in claim 1 or 2, a positive electrode capable of occluding and releasing lithium ion, and an electrolyte arranged between the negative electrode and the positive electrode.

* * * * *